United States Patent
Lu et al.

(10) Patent No.: US 11,499,052 B2
(45) Date of Patent: Nov. 15, 2022

(54) METHOD FOR PREPARING LYCOPENE CRYSTALS WITH HIGH PURITY AND LOW HARM

(71) Applicant: CHENGUANG BIOTECH GROUP CO., LTD., Hebei (CN)

(72) Inventors: Qingguo Lu, Hebei (CN); Yunhe Lian, Hebei (CN); Zhiming Zhang, Hebei (CN); Xiaodong An, Hebei (CN); Qianli Li, Hebei (CN); Wei Gao, Hebei (CN)

(73) Assignee: CHENGUANG BIOTECH GROUP CO., LTD., Hebei (CN)

( * ) Notice: Subject to any disclaimer, the term of this patent is extended or adjusted under 35 U.S.C. 154(b) by 338 days.

(21) Appl. No.: 16/758,899

(22) PCT Filed: Oct. 25, 2017

(86) PCT No.: PCT/CN2017/107703
§ 371 (c)(1),
(2) Date: Apr. 24, 2020

(87) PCT Pub. No.: WO2019/080017
PCT Pub. Date: May 2, 2019

(65) Prior Publication Data
US 2020/0347234 A1  Nov. 5, 2020

(51) Int. Cl.
C09B 61/00 (2006.01)
C09B 67/54 (2006.01)

(52) U.S. Cl.
CPC .......... *C09B 67/0096* (2013.01); *C09B 61/00* (2013.01)

(58) Field of Classification Search
CPC ............................ C09B 67/0096; C09B 61/00
USPC ........................................................ 585/836
See application file for complete search history.

(56) References Cited

U.S. PATENT DOCUMENTS

| | | | | |
|---|---|---|---|---|
| 5,858,700 A * | 1/1999 | Ausich | ................... | A61K 36/81 |
| | | | | 435/946 |
| 5,965,183 A * | 10/1999 | Hartal | ....................... | A23L 5/44 |
| | | | | 426/651 |
| 9,456,994 B2 * | 10/2016 | Sunil Kumar | ...... | C07C 7/14891 |
| 9,682,932 B2 * | 6/2017 | Joseph | .................. | C07C 403/24 |

FOREIGN PATENT DOCUMENTS

| | | |
|---|---|---|
| CN | 1687239 A | 10/2005 |
| CN | 1775867 A | 5/2006 |
| CN | 1807410 A | 7/2006 |
| CN | 103039437 A | 4/2013 |
| CN | 104938978 A | 9/2015 |
| CN | 105694527 A | 6/2016 |
| WO | 2017084493 A1 | 5/2017 |

OTHER PUBLICATIONS

English Abstract of CN10384183 A dated Jun. 4, 2014.*
English Abstract of CN 1472183 A dated Feb. 4, 2004.*
PCT International Search Report (Translated) for Intl. App. No. PCT/CN2017/107703 dated Aug. 1, 2018, from which the instant application is based, 2 pgs.
Huang, Z., "Preservation of Tomato Peel Residue," Xinjiang Animal Husbandry, non-official translation, Dec. 31, 2013, No. 12, (pp. 40-41), with English translation, 6 pgs.

* cited by examiner

Primary Examiner — Eisa B Elhilo
(74) Attorney, Agent, or Firm — Fredrikson & Byron, P.A.

(57) ABSTRACT

The present invention relates to a method for preparing lycopene crystals with high purity and low harm. The method comprises the following steps: (1) mixing lycopene oleoresin with a mixed solvent consisting of an alkane and a lower alcohol, and heating and stirring the resultant for dissolution to form a homogenous solution; (2) cooling the homogenous solution for crystallization, filtering the resultant to obtain a filter cake; and (3) washing the filter cake successively using a lower alcohol and an alkane, and drying the resultant to obtain lycopene crystals. According to the method provided by the present invention, lycopene crystals can be obtained using a mixed solvent by means of one step crystallization, and the crystal content is further improved and harmful substances in the crystals are reduced by means of a two-step crystal washing process to obtain lycopene crystals with high purity and low harm. The method is fast and convenient, lycopene crystals with high purity, low harm, and sanitary safety can be produced, and the method is suitable for industrial production.

32 Claims, No Drawings

METHOD FOR PREPARING LYCOPENE CRYSTALS WITH HIGH PURITY AND LOW HARM

RELATED APPLICATIONS

This application is a 35 U.S.C. 371 national stage filing from International Application No. PCT/CN2017/107703, filed Oct. 25, 2017, the teachings of which are incorporated herein by reference.

TECHNICAL FIELD

The present invention relates to the field of industrial production of natural plant extracts, in particular to a method for preparing lycopene crystals with high purity and low harm.

BACKGROUND ART

Lycopene is a natural pigment contained in plants. It mainly exists in the mature fruits of the tomato which belongs to the family Solanaceae. At present, lycopene is mostly extracted from the tomato pulp, and the tomato peel with high lycopene content is a waste in the production of tomato paste. If the tomato peel could be effectively used, not only could waste be turned into treasure, but also huge social benefits could be created.

However, due to the increasingly serious environmental pollution, the content of harmful substances such as benzopyrene in the tomato peel are extremely high, directly causing that the content of benzopyrene in lycopene extracted from tomato peel residue is much higher than that in lycopene oleoresin extracted from the tomato pulp.

Lycopene is a fat-soluble pigment, which is not easy to be directly absorbed by the human body, At present, it is mostly used in health products such as capsules, water-dispersible preparations and tablets. In all these forms, lycopene needs to be embedded to be protected from oxidation, at the same time, the fat-soluble lycopene is transformed into a water-soluble substance which is easy for human body to absorb and use. In order to ensure the stability of the embedded products, the raw materials used for embedding are generally crystals with relatively high purity, so that there is enough space to add wall materials. Most of the lycopene commercial available at present is lycopene oleoresin with a content of lycopene of about 15%. As a result, there is an urgent need to develop a simple and feasible method for preparing lycopene crystals to meet market requirements.

At present, there are relatively few patents on the preparation of lycopene crystals, and the preparation methods are relatively complicated and time-consuming, and the purity of the obtained crystals is relatively low In the Patent Publication No. CN1775867A, the lycopene oleoresin is mixed with an alcohol solution, and the resultant is filtered to obtain the lycopene crystals. In this patent application, only a polar alcohol solvent is used to remove impurities from lycopene, and only a part of impurities can be removed. The obtained crystal still contains a lot of impurities, has a large viscosity, and is extremely difficult to he filtered; and the purity of the crystal is also low, which could only reach 19% to 65%. In the Patent Publication No. CN1687239A, a multi-stage purification step is adopted, which involves saponification, separation, and recrystallization. This method is cumbersome, and it involves the use of acid and alkali and high temperature, which is extremely unfavorable for lycopene. Although the purity of the crystal is high, the yield of crystals is not high. In the Patent Publication No. CN1807410A, lycopene is crystallized three times to obtain high-purity crystals. Recrystallization is a process that loses a large amount of components, and thus it is difficult to guarantee the yield, and production efficiency is relatively low.

In general, most of the current methods for preparing lycopene crystals utilize multiple crystallizations using a single solvent. Repeated recrystallizations result in a long process, and it is disadvantageous to the preservation of lycopene. Besides, the purities of lycopene crystals obtained in most crystallization processes are low, and it is difficult to achieve a purity of 80% or more. Moreover, in the existing crystallization processes, the removal of the harmful substances including benzopyrene has not been considered. At present, with the vigorous promotion of food safety, lycopene crystals with low harm are needed for the market development. In brief, there is an urgent need to develop lycopene crystals with high purity and low harm, and the process needs to be simple and easy for industrial production.

SUMMARY OF THE INVENTION

The object of the present invention is to overcome the defects in the prior art, and to provide a method for preparing lycopene crystals with high-purity and low harm. The method provided by the invention has the advantages of simple preparation process, high purity and low harm of the obtained crystal, and easiness for realizing industrial production.

Specifically, the method provided by the present invention includes the following steps:

(1) mixing lycopene oleoresin with a mixed solvent consisting of an alkane and a lower alcohol, healing and stirring the resultant for dissolution to form a homogenous solution;

(2) cooling the homogenous solution for crystallization, filtering the resultant to obtain a filter cake:

(3) washing the filter cake successively using a lower alcohol and an alkane, and drying the resultant to obtain lycopene crystals.

The method provided by the present invention uses a mixed solvent for crystallization, and lycopene crystals could be obtained by only one step of crystallization. After the crystals are obtained, a multi-step crystal washing method using different solvents for washing could not only improve the purity of the crystals, but also reduce the content of harmful substances in the crystals, thereby obtaining lycopene crystals with high purity and low harm.

The invention adopts a mixed solvent crystallization technology, and the mixed solvent is prepared by mixing an alkane and a lower alcohol. Due to the complex composition of lycopene oleoresin, crystallization with a single solvent could not guarantee complete removal of impurities, and the lycopene obtained after crystallization with a single solvent still contains other impurities and appears as a paste, which makes it difficult to separate the crystals from the solvent, and a centrifugal equipment with a high separation factor is needed to ensure the complete separation of crystals and solvents. Furthermore, in order to improve the purity of lycopene crystals, it is needed to repeat recrystallization 2 to 3 times when using a single solvent crystallization so as to remove most impurities of the lycopene oleoresin, and this process takes a long time, and consumes a large amount of energy due to the low temperature required for crystallization. In addition, because lycopene crystals are easily oxidized, a large amount of lycopene will be oxidized and lost during multiple crystallization processes. In the present invention, it has been found through a lot of practice that, crystallization using a mixed solvent consisting of an alkane and a lower alcohol could dissolve most of the impurities and harmful substances in the crystals in the solvent, and the resulting crystals are in the form of powder, which could be completely separated from the impurities by simple filtration. Moreover, the crystals could be obtained by only one-step method, which could not only shorten the time (crystallization time is only 6 to 10 h), but also achieve crystallization at a temperature between 15° C. and 25° C.

Specifically, the alkane used in the present invention is preferably one or more selected from n-hexane, cyclohexane, and No. 6 extraction solvent oil, more preferably n-hexane. The lower alcohol in the present invention specifically refers to alcohols having 1 to 5 carbon atoms, preferably is selected from one or more of methanol, ethanol, and isopropanol. more preferably methanol.

In order to ensure that the mixed solvent sufficiently dissolves impurities and makes lycopene crystals easier to be precipitated, it is preferred in the present invention that the volume ratio of the alkane to the lower alcohol is 2:1 to 4:1, more preferably 3:1 to 4:1.

In actual operation, in order to ensure that the crystals are precipitated at a suitable speed and have high purity, and it is easy to control industrially, it is preferred in the present invention that the mass-to-volume ratio of the lycopene oleoresin to the mixed solvent is 4:1 to 8:1, more preferably 6:1 to 8:1.

In the step (1), the temperature for heating dissolution is preferably 35° C. to 60° C., more preferably 55° C. to 60° C. As a preferred embodiment of the present invention, the time for heating dissolution is 15 min to 40 min, more preferably 30 min to 40 min.

In the step (2), the temperature for cooling crystallization is preferably 15° C. to 25° C., more preferably 20° C. to 25° C. As a preferred embodiment of the present invention, the time for cooling crystallization is 6 hours to 10 hours, more preferably 6 hours to 8 hours.

After crystallization in step (2), a filter cake and filtrate are obtained by filtration. After the filter cake is washed and dried in two steps, the target product could be obtained, and after the filtrate is concentrated, low-content lycopene oleoresin could be obtained.

In the step (3), the invention adopts a step-by-step crystal washing method to improve the purity of crystals and reduce the content of harmful substances. Since the tomato peel as the skin of the fruit contains much more benzopyrene than the tomato pulp and benzopyrene is easily dissolved in the alkane solvent used to extract lycopene, the lycopene oleoresin obtained by extracting the tomato peel residues contains a lot of benzopyrene. The present invention uses a mixed solvent for crystallization, which makes most of the benzopyrene left in the low-content oleoresin on the basis of ensuring that the crystals are crystallized from the oleoresin in only one step, and further uses different solvents to carry out the multi-step crystal washing method to further decrease the content of benzopyrene in the lycopene after crystallization.

Specifically, the present invention first uses a polar alcohol solvent to wash the crystals so as to remove a part of polar impurities such as fatty acids, so that the washed crystals are no longer viscous and more loose, which is beneficial for the later removal of benzopyrene wrapped in crystals by alkane solvent. After washing with an alcohol solvent, the filter cake is washed with an alkane solvent at 15° C. to 25° C., preferably 20° C. to 25° C., which could remove the harmful substances such as benzopyrene, without causing dissolution of the lycopene crystals. The content of benzopyrene in the lycopene crystals obtained after two-step washing could be reduced from about 100 ppm to 10 ppm or less, and the purity of the product could reach 80% to 95%. The lower alcohol solvent used for washing is preferably an aqueous solution of a lower alcohol having not more than four carbon atoms, preferably an ethanol aqueous solution; the volume fraction of the lower alcohol aqueous solution is preferably 75% to 95%. The alkane solvent used for washing is preferably one or more selected from n-hexane, cyclohexane, and No. 6 extraction solvent oil, more preferably n-hexane.

In actual operation, in order to ensure sufficient washing while saving the amount of solvent to facilitate industrial production and environmental protection, in the present invention, the filter cake is preferably washed with a lower alcohol at a volume of 2 to 5 times the wet weight of the filter cake to increase the content of crystals, and then the filter cake is washed with alkane at a volume of 3 to 8 times the wet weight of the filter cake at 15° C. to 25° C. to further increase the content of crystals and remove benzopyrene and other harmful substances. Each solvent could be used for washing multiple times, that is, alcohol solvent(s) could be used for washing multiple times and alkane(s) could be used for washing multiple times so as to ensure the best washing effect.

In order to ensure the quality of the lycopene crystals, the drying in the present invention is preferably performed under vacuum at 30° C. to 60° C. The drying time is preferably 5 hours to 10 hours.

In order to ensure that the product is safer and more hygienic, and to reduce the oxidation of lycopene crystals, it is preferable to perform the entire crystallization process of steps (1) to (3) in a fully-closed device, i.e., a "four-in-one" device for dissolving, crystallization, washing and drying, which can prevent crystals from not only continuous contact with the outside surrounding, which causes oxidation of lycopene, during the crystallization process, but also continuous contact with harmful substances such as microorganisms in the air. However, in the existing preparation process of lycopene crystals, due to the viscous crystals and much impurities, it is necessary to use centrifugation or left to stand for a long time to complete the entire process. Therefore, the successful application of the "four-in-one" device in lycopene crystallization is a tremendous progress in the overall process for preparing lycopene crystals.

The lycopene oleoresin used as a raw material in the present invention refers to the lycopene oleoresin well-known in the art, which can be either commercially available or prepared by oneself.

As a preferred embodiment of the present invention, the lycopene oleoresin could be prepared by a method including the following steps: fully extracting dehydrated and dried tomato peel with a combined solvent composed of alkane(s) (such as n-hexane) and ketone(s) (such as acetone), and recovering the solvent to obtain the lycopene oleoresin. The volume ratio of alkane(s) to ketone(s) in the combined solvent is preferably 2:1 to 5:1. The extraction temperature is preferably 35° C. to 60° C.

In actual production, tomato peel residue as raw material is subjected to dehydration and drying to give dried tomato peel residue, and the peel in the dried tomato peel residue is separated from seeds. The tomato seeds are used to extract tomato seed oil, and the obtained dried tomato peel is processed into dried tomato peel particles (e.g. with a diameter of 3 to 7 mm, and a length of 0.7 to 2 cm), and then added with solvent for extraction, thereby ensuring the full extraction of lycopene.

The method provided by the present invention could obtain lycopene crystals by one-step crystallization with a mixed solvent, and further adopts a two-step crystal washing method to further increase the content of crystals and reduce the harmful substances in the crystals to obtain lycopene crystals with high purity and low harm, and a closed "four-in-one" device is used in the entire production process, which makes production fast and convenient, and lycopene crystals with high purity, low harm and sanitary safely is produced, and the method is suitable for industrial production.

SPECIFIC MODES FOR CARRYING OUT THE EMBODIMENTS

The specific embodiments of the present invention will be further described in detail in combination with figures and Examples. The following Examples are intended to illustrate the present invention, but not intended to limit to the scope of the present invention.

In the following examples, the lycopene oleoresin could be prepared by the following method:

A: 15 tons of tomato peel residue with a moisture content of 90% was squeezed and dehydrated by screw press equipment, and cylinder dried to obtain dried tomato peel residue;

B: The peel in the dried tomato peel residue was separated from seeds; the obtained dried tomato peel was processed into particles with a diameter of 7 mm and a length of 2 cm, and the separated tomato seeds were used to extract tomato seed oil.

C: The tomato particles obtained in step B were extracted using a combined solvent with a ratio of n-hexane to acetone of 5:1 at a temperature of 60° C. for 120 minutes. After concentrating under reduced pressure to recover the solvent, lycopene oleoresin was obtained.

EXAMPLE 1

The present Example provides a method for preparing lycopene crystals with high-purity and low harm, specifically comprising the following steps:

(1) the lycopene oleoresin was mixed with a combined solvent with a ratio of 3:1 of n-hexane to methanol at a ratio of oleoresin to solvent of 4:1 in a "four-in-one" device at a temperature of 35° C., and dissolved for 15 min to obtain a homogenous solution;

(2) the homogenous solution obtained from dissolving in step (1) was cooled to 15° C. and crystallized for 6 hours; after the crystallization was completed, filtration was performed directly in the device to obtain a filter cake of lycopene crystals;

(3) the filter cake was washed with 80% ethanol aqueous solution at a volume of 2 times the wet weight of the filter cake to increase the content of crystals; then the filter cake was washed with n-hexane at a volume of 3 times the wet weight of the filter cake at 15° C. to further increase the content of crystals and remove benzopyrene and other harmful substances. The washed filter cake was dried under vacuum at 40° C. for 10 hours to obtain lycopene crystals.

The purity of the lycopene crystals obtained by the present method was 85%, and the content of benzopyrene in the crystals was <10 ppm.

EXAMPLE 2

The present Example provides a method for preparing lycopene crystals with high-purity and low harm, specifically comprising the following steps:

(1) the lycopene oleoresin was mixed with a combined solvent with a ratio of 2:1 of n-hexane and methanol at a ratio of oleoresin to solvent of 6:1 in a "four-in-one" device at a temperature of 55° C., and dissolved for 30 min to obtain a homogenous solution;

(2) the homogenous solution obtained from dissolving was cooled to 20° C. and crystallized for 8 hours; after the crystallization was completed, filtration was performed directly in the device to obtain a filter cake of lycopene crystals;

(3) the filter cake was washed with 75% ethanol aqueous solution at a volume of 4 times the wet weight of the filter cake to increase the content of crystals; then the filter cake was washed with cyclohexane at a volume of 6 times the wet weight of the filter cake at 20° C. to further increase the content of crystals and remove benzopyrene and other harmful substances. The washed filter cake was dried under vacuum at 30° C. for 8 hours to obtain lycopene crystals.

The purity of the lycopene crystals obtained by the present method was 90%, and the content of benzopyrene in the crystals was <10 ppm.

EXAMPLE 3

The present Example provides a method for preparing lycopene crystals with high-purity and low harm, specifically comprising the following steps:

(1) the lycopene oleoresin was mixed with a combined solvent with a ratio of 4:1 of n-hexane and methanol at a ratio of oleoresin to solvent of 8:1 in a "four-in-one" device at a temperature of 60° C., and dissolved for 40 min to obtain a homogenous solution;

(2) the homogenous solution obtained from dissolving was cooled to 25° C. and crystallized for 6 hours; after the crystallization was completed, filtration was performed directly in the device to obtain a filter cake of lycopene crystals;

(3) the filter cake was washed with 95% ethanol aqueous solution at a volume of 5 times the wet weight of the filter cake to increase the content of crystals, then the filter cake was washed with No. 6 extraction solvent oil at a volume of 8 times the wet weight of the filter cake at 25° C. to further increase the content of crystals and remove benzopyrene and other harmful substances. The washed filter cake was dried under vacuum at 60° C. for 10 hours to obtain lycopene The purity of the lycopene crystals obtained by the present method was 93.7%, and the content of benzopyrene in the crystals was <10 ppm.

Comparative Example 1

Compared with Example 3, the difference only lies in that the combined solvent composed of n-hexane and methanol was replaced with petroleum ether.

After testing, the purity of the lycopene crystals obtained by the method of the present Comparative Example was 55%, and the content of benzopyrene in the crystals was 200 ppm.

The above contents are only preferred embodiments of the present invention and are not intended to limit the present invention. Any modification, equivalent replacement, improvement and the like made according to the spirit and principle of the present invention should be regarded as within the protection scope of the invention.

What is claimed is:

1. A method for preparing lycopene crystals with high-purity and low harm, comprising the following steps:
   (1) mixing lycopene oleoresin with a mixed solvent consisting of an alkane and a lower alcohol, heating the resultant for dissolution to form a homogenous solution;
   (2) cooling the homogenous solution for crystallization, filtering the resultant to obtain a filter cake; and
   (3) washing the filter cake successively using a lower alcohol and an alkane, and drying the resultant to obtain lycopene crystals.

2. The method according to claim 1, wherein the alkane in step (1) is one or more selected from n-hexane, cyclohexane, and No. 6 solvent-extracted oil;
   and/or, the lower alcohol is one or more selected from methanol, ethanol and isopropanol.

3. The method according to claim 1, wherein the volume ratio of alkane to lower alcohol in the mixed solvent is 2:1 to 4:1.

4. The method according to claim 1, wherein in step (1), the mass-to-volume ratio of the lycopene oleoresin to the mixed solvent is 4:1 to 8:1.

5. The method according to claim 1, wherein the temperature for heating dissolution in step (1) is 35° C. to 60° C.

6. The method according to claim 1, wherein the temperature for cooling crystallization in step (2) is 15° C. to 25° C.

7. The method according to claim 1, wherein the lower alcohol in step (3) is an aqueous solution with a volume fraction of 75% to 95% of a lower alcohol having not more than four carbon atoms;
   and/or, the temperature of alkane is 15° C. to 25° C.; the alkane is one or more selected from n-hexane, cyclohexane, and No. 6 solvent-extracted oil.

8. The method according to claim 1, wherein the drying is performed under vacuum at 30° C. to 60° C.

9. The method according to claim 1, wherein the entire process of steps (1) to (3) is performed in a fully closed "four-in-one" device for dissolving, crystallization, washing and drying.

10. The method according to claim 1, wherein the lycopene oleoresin is prepared by a method including the steps of: fully extracting dehydrated dried tomato peel in a combined solvent composed of alkane(s) and ketone(s), and recovering the solvent to obtain the lycopene oleoresin.

11. The method according to claim 2, wherein the volume ratio of alkane to lower alcohol in the mixed solvent is 2:1 to 4:1.

12. The method according to claim 2, wherein in step (1), the mass-to-volume ratio of the lycopene oleoresin to the mixed solvent is 4:1 to 8:1.

13. The method according to claim 3, wherein in step (1), the mass-to-volume ratio of the lycopene oleoresin to the mixed solvent is 4:1 to 8:1.

14. The method according to claim 2, wherein the temperature for heating dissolution in step (1) is 35° C. to 60° C.

15. The method according to claim 3, wherein the temperature for heating dissolution in step (1) is 35° C. to 60° C.

16. The method according to claim 4, wherein the temperature for heating dissolution in step (1) is 35° C. to 60° C.

17. The method according to claim 2, wherein the temperature for cooling crystallization in step (2) is 15° C. to 25° C.

18. The method according to claim 3, wherein the temperature for cooling crystallization in step (2) is 15° C. to 25° C.

19. The method according to claim 4, wherein the temperature for cooling crystallization in step (2) is 15° C. to 25° C.

20. The method according to claim 5, wherein the temperature for cooling crystallization in step (2) is 15° C. to 25° C.

21. The method according to claim 2, wherein the lower alcohol in step (3) is an aqueous solution with a volume fraction of 75% to 95% of a lower alcohol having not more than four carbon atoms;
   and/or, the temperature of alkane is 15° C. to 25° C.; the alkane is one or more selected from n-hexane, cyclohexane, and No. 6 solvent-extracted oil.

22. The method according to claim 3, wherein the lower alcohol in step (3) is an aqueous solution with a volume fraction of 75% to 95% of a lower alcohol having not more than four carbon atoms;
   and/or, the temperature of alkane is 15° C. to 25° C.; the alkane is one or more selected from n-hexane, cyclohexane, and No. 6 extraction solvent solvent-extracted oil.

23. The method according to claim 4, wherein the lower alcohol in step (3) is an aqueous solution with a volume fraction of 75% to 95% of a lower alcohol having not more than four carbon atoms;
   and/or, the temperature of alkane is 15° C. to 25° C.; the alkane is one or more selected from n-hexane, cyclohexane, and No. 6 solvent-extracted oil.

24. The method according to claim 5, wherein the lower alcohol in step (3) is an aqueous solution with a volume fraction of 75% to 95% of a lower alcohol having not more than four carbon atoms;
   and/or, the temperature of alkane is 15° C. to 25° C.; the alkane is one or more selected from n-hexane, cyclohexane, and No. 6 solvent-extracted oil.

25. The method according to claim 6, wherein the lower alcohol in step (3) is an aqueous solution with a volume fraction of 75% to 95% of a lower alcohol having not more than four carbon atoms;
   and/or, the temperature of alkane is 15° C. to 25° C.; the alkane is one or more selected from n-hexane, cyclohexane, and No. 6 solvent-extracted oil.

26. The method according to claim 2, wherein the drying is performed under vacuum at 30° C. to 60° C.

27. The method according to claim 3, wherein the drying is performed under vacuum at 30° C. to 60° C.

28. The method according to claim 4, wherein the drying is performed under vacuum at 30° C. to 60° C.

29. The method according to claim 5, wherein the drying is performed under vacuum at 30° C. to 60° C.

30. The method according to claim 6, wherein the drying is performed under vacuum at 30° C. to 60° C.

31. The method according to claim 7, wherein the drying is performed under vacuum at 30° C. to 60° C.

32. The method according to claim 10, wherein the volume ratio of the alkane(s) to ketone(s) in the combined solvent is 2:1 to 5:1; and/or, the extraction temperature is 35° C. to 60° C.

* * * * *